Jan. 5, 1965

J. M. GAULT 3,163,916

UNIJUNCTION TRANSISTOR DEVICE

Filed June 22, 1962

2 Sheets-Sheet 1

INVENTOR.
JOHN M. GAULT

BY

OSTROLENK, FABER, GERB & SOFFEN

ATTORNEYS

Jan. 5, 1965 J. M. GAULT 3,163,916

UNIJUNCTION TRANSISTOR DEVICE

Filed June 22, 1962

2 Sheets-Sheet 2

INVENTOR.
JOHN M. GAULT

BY

OSTROLENK, FABER, GERB & SOFFEN

ATTORNEYS

United States Patent Office 3,163,916

Patented Jan. 5, 1965

3,163,916

UNIJUNCTION TRANSISTOR DEVICE

John M. Gault, Manhattan Beach, Calif., assignor to International Rectifier Corporation, El Segundo, Calif., a corporation of California Filed June 22, 1962, Ser. No. 204,391
4 Claims. (Cl. 29—25.3)

This invention relates to a novel method of manufacture for transistor devices and to a unique arrangement of a transistor-type structure. More specifically, the invention relates to a method of manufacture for unijunction transistors and field effect transistors wherein a large number of units are formed at one and the same time with the individual devices being separated only after a large number of operations have been performed on a common structure.

Accordingly, a primary object of this invention is to provide a novel method of manufacture for transistor devices wherein a plurality of operations are performed on a common structure which is thereafter separated into a plurality of units.

Another object of this invention is to provide a novel method of manufacture for unijunction transistors and field effect transistors.

A further object of this invention is to provide a novel method of manufacture for transistor-type devices which substantially reduces the expense of the devices.

These and other objects of this invention will become apparent from the following description when taken in connection with the drawings, in which.

In accordance with the invention, a large area wafer is formed from a silicon ingot which is, for example, of the N-type and has a resistivity of from 90 to 110 ohms-centimeters. The ingot is sliced into wafers which are of the order of 0.0205 inch thick with the wafer being of the order of ¾ inch diameter. These wafers are lapped flat, and parallel, to a thickness of the order of 0.018 inch.

It is to be noted that while the following description is assumed to start with an N-type material, the conductivity types could be reversed with appropriate reversal of the doping agents so that a P-type starting material could be used.

Figure 1:
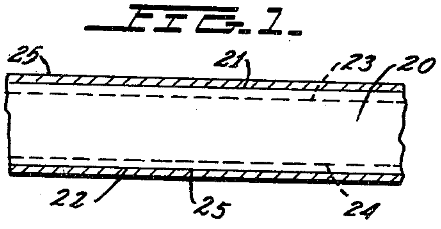
FIGURE 1 shows a side cross-sectional view of a large area wafer during the initial stage of the manufacturing process.

This wafer is illustrated in FIGURE 1 with the various dimensions being greatly exaggerated and out of proportion for purposes of clarity. The wafer is more specifically indicated in FIGURE 1 as wafer 20.

The wafer 20 is placed in an appropriate atmosphere of $P_2O_5$ and $O_2$, and is brought to a temperature of the order of 1150° C. for approximately 30 minutes. This creates a consistent phospho-silicate glass 25 on the opposing surfaces 21 and 22 of wafer 20 of FIGURE 1 where there is a phosphorous penetration into the silicon surfaces, as indicated by dotted lines 23 and 24 respectively of the order of 0.0005 inch.

Thereafter, the surface 22 of wafer 20 is masked with an appropriate wax masking material, which will not react to a hydrofluoric acid etch, such as layer 26, and the wafer is then immersed in a solution of hydrofluoric acid for a time sufficiently long to remove the phospho-silicate glass on the surface 21 of wafer 20.

Figure 2:
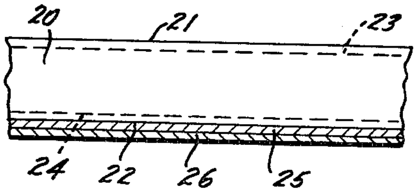
FIGURE 2 shows the wafer of FIGURE 1 after the formation of N+ regions in the wafer surface.

As shown in FIGURE 2, the lower surface 22 of wafer 20 retains the layer 25 of phospho-silicate glass because of the layer of masking wax 26.

The wax mask 26 of FIGURE 2 is then removed from the wafer in any appropriate manner, and the wafers are mounted in a sandblasting jig. A plurality of parallel grooves are then sandblasted into the surface 21 of wafer 20, as illustrated in FIGURE 3 by the grooves 30, 31 and 32.

The width of grooves 30, 31 and 32 is of the order of 0.010 inch with a depth of the order of 0.003 inch. The grooves are spaced by the order of .050 inch center to center.

Thereafter, a boron doping solution such as $B_2O_3$ dissolved in methyl Cellosolve is painted in the grooves such as grooves 30, 31 and 32, and the wafer is placed in a diffusion furnace and brought to a temperature of the order of 1270° C. for approximately ½ hour. The wafer is then permitted to cool to room temperature.

Figure 3:
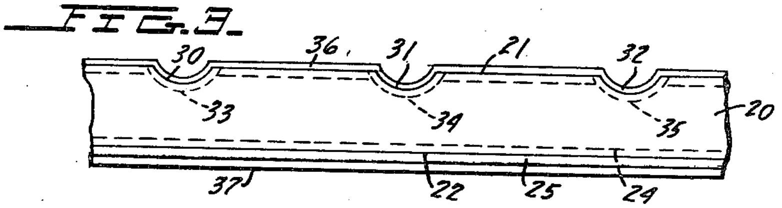
FIGURE 3 shows the wafer of FIGURE 2 with grooves formed in the upper surface thereof after a doping operation.

As indicated in FIGURE 3, this operation will cause P-plus regions 33, 34 and 35 to be formed in the surfaces of grooves 30, 31 and 32 respectively, whereas the remaining portions of the surface are N-plus by virtue of the initial phosphorous diffusion.

Thereafter, the various surfaces of the device are prepared in an appropriate manner for nickel-plating as by lightly sandblasting. A nickel-plating (layers 36 and 37 of FIGURE 3) is then applied by any well known electroless process followed by a sintering process and an additional electroless nickel coating.

Figure 4:
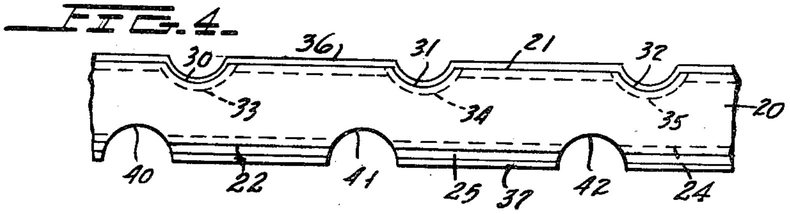
FIGURE 4 shows the wafer of FIGURE 3 after nickel plating and a second set of grooves have been placed in the rear surface of the wafer.

The device is then returned to the sandblasting jig, and grooves slightly displaced from grooves 30, 31 and 32 are cut in the opposite surface, as illustrated in FIGURE 4, as grooves 40, 41 and 42 which are opposite from, but staggered from, grooves 30, 31 and 32 respectively. The grooves 40, 41 and 42 may be identical to grooves 30, 31 and 32, and have a width of the order of 0.010 inch, and a depth of 0.003 inch.

The device of FIGURE 4 is thereafter placed in a lapping device, and the upper surface 21 is lapped to remove the nickel-plating and N doped region from the flat surfaces adjacent to the grooves. Thereafter, all of the remaining nickel-plated surfaces are tinned and coated with a solder such as pure lead.

Figure 5:
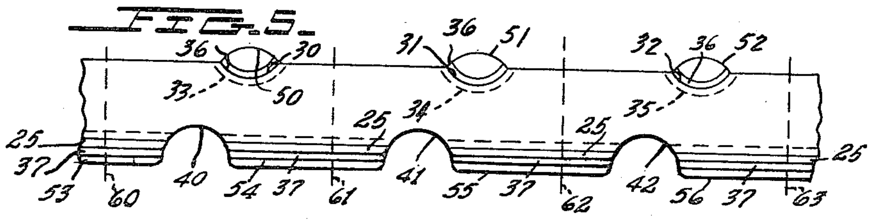
FIGURE 5 shows the wafer of FIGURE 4 after a lapping and soldering operation.

The wafer 20 will then have the cross-section shown in FIGURE 5 where the grooves 30, 31 and 32 are filled with solder portions 50, 51 and 52 respectively, while the regions adjacent grooves 40, 41 and 42 are coated with solder portions 53, 54, 55 and 56.

The wafer of FIGURE 5 is thereafter sliced into strips which are parallel to the grooves where the slice is made intermediate of upper and lower grooves on the surfaces which have the greatest displacement. By way of example, and in FIGURE 5, the device is sliced along dotted lines 60, 61, 62 and 63 whereby the wafer having a diameter of ¾ inch can be sliced into approximately 15 individual strips. Thereafter, each of the strips of the ¾ inch diameter wafer are diced to form bars, as illustrated in perspective view in FIGURE 6, having a width of the order of 0.015 inch, a height of the order of 0.015 inch, and a length of the order of 0.040 inch.

Thus, appproximately 250 devices can be obtained from the initial wafer 20 wherein a great number of the device-forming operations have been performed on the single large wafer 20 so as to eliminate the need for handling the great number of resulting devices.

Figure 6:
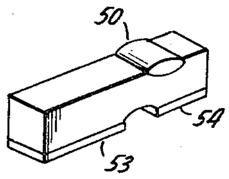
FIGURE 6 illustrates a bar formed of a diced strip taken from the large area wafter of FIGURE 5.
Figure 7:
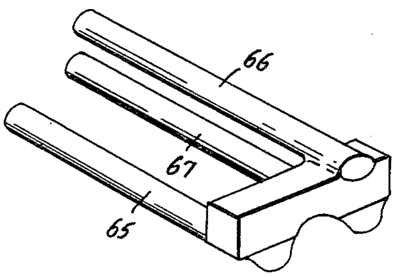
FIGURE 7 shows the bar of FIGURE 6 with the leads attached thereto.

Thereafter, three leads such as leads 65, 66 and 67 can be applied to the solder coated regions 53, 50 and 54 of FIGURE 6, as illustrated in FIGURE 7, by any appropriate soldering technique. The unit may then be etched in an appropriate manner, and tested, and if it successfully passes quality control tests, can be coated with a protective surface, or potted in any appropriate manner.

The attachment of the leads, as illustrated in FIGURE 7, can be performed in any desired manner, as indicated above.

The operation of the unijunction or field effect transistor formed with a single junction is well known to the art and need not be further described herein.

Figure 8:
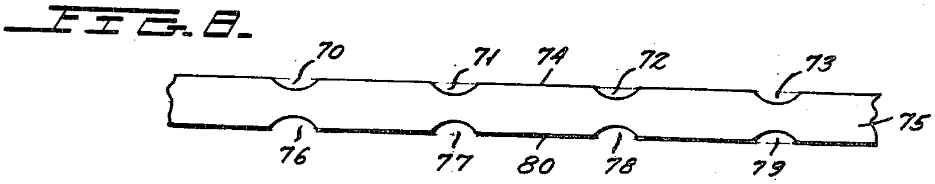
FIGURE 8 shows the formation of grooves into a wafer of the type of FIGURE 1 in accordance with a second embodiment of the invention.

In accordance with the second embodiment of the invention, a large area wafer is obtained and initially treated in a manner identical to that described in FIGURE 1. In accordance with the second embodiment of the invention, however, and prior to the phosphorous doping operation, the wafer, as shown in FIGURE 8, which could have the dimensions of ¾ inch diameter by 0.018 inch thick after lapping, will have a plurality of grooves sandblasted therein or cut therein in any appropriate manner. This is shown in FIGURE 8 where parallel grooves 70 through 73 in surface 74 of wafer 75, and grooves 76 through 79 are initially cut in the lower surface 80 of wafer 75. The grooves 70 through 79 can, for example, have a width of 0.010 inch and a depth of 0.004 inch, with the spacing between the bottoms of opposing grooves being as small as possible compatible with reasonable strength to permit subsequent handling of the large area wafer.

The complete wafer is thereafter doped with phosphorous, as by placing the wafer in an atmosphere of $P_2O_5$ and $O_2$ at about 1150° C. for approximately 30 minutes, whereupon the exposed surfaces of the wafer are rendered N+ to a depth of the order of 0.0005 inch.

The grooves 70 through 73 and 76 through 79 are thereafter filled with a suitable masking wax, and the device is immersed in hydrofluoric acid to remove the phospho-silicate glass from the surfaces 74 and 80 of the wafer.

Figure 9:
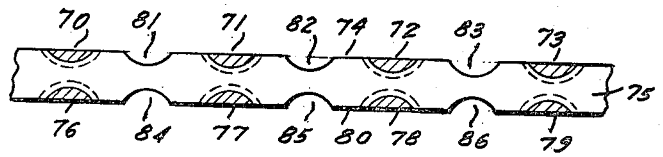
FIGURE 9 shows the wafer of FIGURE 8 after a doping operation.

Alternatively, the silicate glass coating could be removed by a gentle lap. Thereafter, and with the masking wax still in position, two more sets of parallel grooves are placed in the opposite sides of the wafer parallel to the original set, as illustrated in FIGURE 9 by grooves 81 through 86. It will be noted in FIGURE 9 that the initial grooves still contain the masking wax, as indicated in cross-hatched lines. The grooves 81 through 86 are somewhat shallower than the initial grooves and could, for example, have a depth of 0.003 inch, and a width of the order of 0.010 inch.

The wax is then removed from grooves 70 through 73 and 76 through 79, and a boron doping solution such as $B_2O_3$ dissolved in methyl Cellosolve is painted in the new set of grooves 81 through 86. The wafer is then placed in a diffusion furnace and brought to the order of 1270° C. for approximately ½ hour, and is then cooled slowly to room temperature.

Figures 10, 11:
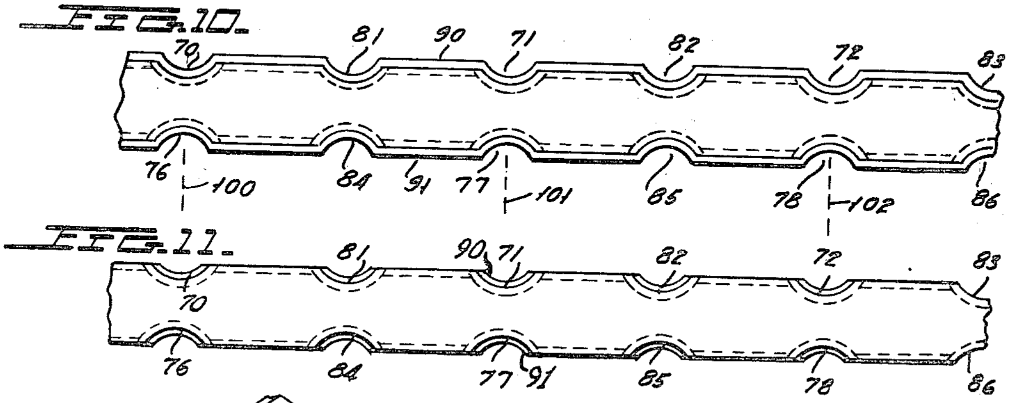
FIGURE 10 shows the wafer of FIGURE 9 after a nickel-plating operation.
FIGURE 11 shows the wafer of FIGURE 10 after the nickel-plating on the flat surfaces of the wafer have been removed.

The device is then prepared for nickel-plating, and is nickel-plated as described above in the first embodiment of the invention, whereby the resultant device appears as shown in FIGURE 10 wherein the grooves such as groove 70 have an N+ surface region, while grooves such as grooves 81 have a P+ surface region. The complete unit is coated with the nickel-plated coating 90 on its upper surface and nickel-plated coating 91 on its lower surface. Thereafter, the upper and lower surfaces of the wafer are lapped to remove the nickel-plating and any degenerate material on the surface areas, whereby the remaining device is formed of alternate N+ and P+ grooves which are separated by the N material of the initial wafer. The resulting device is illustrated in FIGURE 11.

Thereafter, the wafer is broken into strips along the initial set of grooves, and, as illustrated along dotted lines 100, 101 and 102 where the strips range from zero to ¾ inch long whereupon approximately 18 strips may be obtained from the initial wafer.

Figures 12, 13, 15:
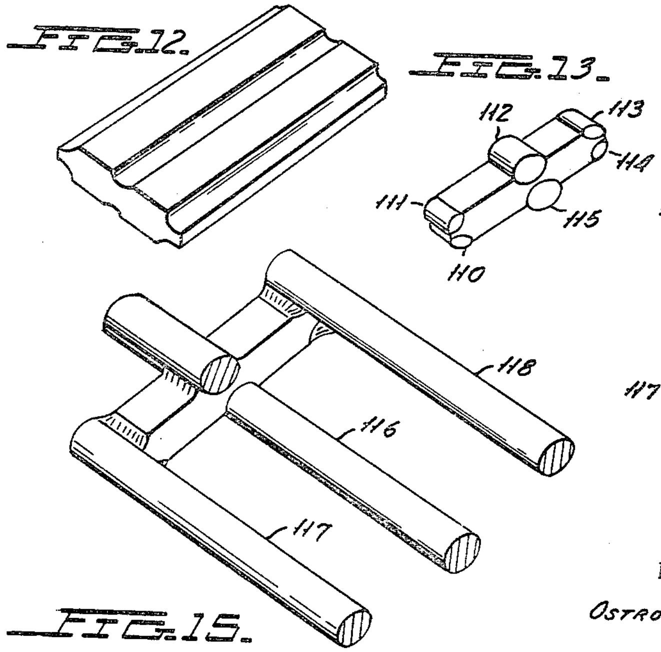
FIGURE 12 shows a perspective view of a strip broken from the wafer of FIGURE 10.
FIGURE 13 shows a bar diced from the strip of FIGURE 12 and with solder attached.
FIGURE 15 shows the bar of FIGURE 13 or 14 after leads are applied thereto.

The nickel-plated surfaces of the strips, one of which is schematically illustrated in FIGURE 12, are then tinned with solder, and the strips are diced into bars where the width of the bar will determine the power rating of the final device. By way of example, and as shown in FIGURE 13, a typical bar can have a width of 0.015 inch, a length of 0.040 inch, and a thickness of 0.015 inch. The bar is best shown in side view in FIGURE 14 to illustrate the resulting device formed in accordance with the invention, wherein solder regions 110, 111, 112, 113, 114 and 115 have been applied to the strip of FIGURE 12 and remain in the diced bar.

Figure 14:
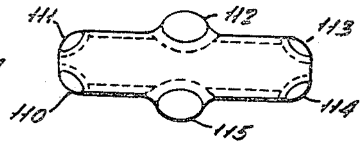
FIGURE 14 shows a side view of the bar of FIGURE 13.
Figure 16:
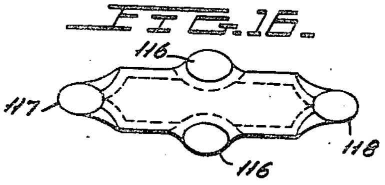
FIGURE 16 shows a cross-sectional view of FIGURE 15 to illustrate the manner in which the leads are secured to the pre-soldered areas of the bar.

Leads may then be applied to the bar of FIGURE 14, as indicated in FIGURE 15 wherein a first lead 116 is hooked at the end thereof so that it is soldered to solder portions 112 and 115, as best shown in FIGURE 16, while lead 117 is soldered to solder portions 110 and 111, and lead 118 is soldered to solder portions 113 and 114.

The device may thereafter be etched and be provided with a protective covering, or can be potted in the usual manner for mechanical protection of the device.

In operation of the device of FIGURES 15 and 16, and as well-known to those skilled in the art, the device may be considered to be analogous to a triode vacuum tube wherein lead 117 is equivalent to a cathode lead, lead 116 is equivalent to a grid lead, while lead 118 is equivalent to an anode lead. When a reverse bias is placed on the two junctions connected to lead 116 arranged in the novel manner of FIGURES 13 through 16, the space charge regions expand from the junction into the bulk of the material to thereby reduce the cross-sectional area available for conduction between leads 117 and 116.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

The embodiments of the invention in which an exclusive privilege or property is claimed are defined as follows:

1. The method of making a semiconductor device comprising the steps of preparing a large area wafer of semiconductor material for receiving a doping agent, forming a thin impurity layer of one of the conductivity types on the opposing surfaces of said wafer, forming a plurality of parallel spaced grooves on the opposing surfaces of said wafer to a depth below the depth of said impurity layers on said opposing surfaces; forming a layer of one of the other conductivity types in a plurality of said grooves on one of said surfaces; attaching electrode means to at least said grooves in said one of said surfaces; and on the opposing sides of said grooves in the other of said surfaces, cutting said wafer into strips parallel to said groove and which include at least a portion of one of said grooves on the opposing sides of said strip; and then cutting each of said strips perpendicularly to form a plurality of bars.

2. The method of making a semiconductor device comprising the steps of forming a first plurality of parallel spaced grooves in the opposing surfaces of a large area wafer of semiconductor material, said first plurality of grooves in said opposing surfaces being directly opposed, forming a thin impurity layer of one of the conductivity types on the opposing surfaces of said wafer, forming a second plurality of parallel spaced grooves on the opposing surfaces of said wafer to a depth below the depth of said impurity layers on said opposing surfaces, said second plurality of grooves spaced alternately with said first plurality of grooves, said second plurality of grooves in said opposing surfaces being directly opposed; forming a layer of one of the other conductivity types in said second plurality of grooves on both of said surfaces; attaching electrode means to at least said first plurality and said second plurality of grooves, cutting said wafers along the centers of said alternate grooves and then cutting each of said strips perpendicularly to form a plurality of bars.

3. The method of making a semiconductor device comprising the steps of forming a first plurality of parallel spaced grooves in the opposing surfaces of a large area wafer of semiconductor material, said first plurality of grooves in said opposing surfaces being directly opposed, forming a thin impurity layer of one of the conductivity types on the opposing surfaces of said wafer, forming a second plurality of parallel spaced grooves on the opposing surfaces of said wafer to a depth below the depth of said impurity layers on said opposing surfaces, said second plurality of grooves spaced alternately with said first plurality of grooves, said second plurality of grooves in said opposing surfaces being directly opposed; forming a layer of one of the other conductivity types in said second plurality of grooves on both of said surfaces; attaching electrode means to at least said first plurality and said second plurality of grooves, cutting said wafers along the centers of said alternate grooves and then cutting each of said strips perpendicularly to form a plurality of bars; said electrode means for connection to the central grooves of strips being hook-shaped to be received by both of said central grooves.

4. The method of making a semiconductor device comprising the steps of forming a first plurality of parallel spaced grooves in the opposing surfaces of a large area wafer of semiconductor material, said first plurality of grooves in said opposing surfaces being directly opposed, forming a thin impurity layer of one of the conductivity types on the opposing surfaces of said wafer, forming a second plurality of parallel spaced grooves on the opposing surfaces of said wafer to a depth below the depth of said impurity layers on said opposing surfaces, said second plurality of grooves spaced alternately with said first plurality of grooves, said second plurality of grooves in said opposing surfaces being directly opposed; forming a layer of one of the other conductivity types in said second plurality of grooves on both of said surfaces; attaching electrode means to at least said first plurality and said second plurality of grooves, cutting said wafers along the centers of said alternate grooves and then cutting each of said strips perpendicularly to form a plurality of bars; said electrode means for connection to the central grooves of strips being hook-shaped to be received by both of said central grooves; said electrode means to be received by said grooves at the sends of said strip comprising respective single conductors connected to both opposing groove portions.

References Cited in the file of this patent

UNITED STATES PATENTS

| | | |
|---|---|---|
| 2,814,853 | Paskell | Dec. 3, 1957 |
| 2,820,154 | Kurshan | Jan. 14, 1958 |
| 2,846,626 | Nowak | Aug. 5, 1958 |
| 2,854,366 | Wannlund | Sept. 30, 1958 |
| 2,967,344 | Mueller | Jan. 10, 1961 |
| 2,985,805 | Nelson | Mar. 23, 1961 |
| 3,022,568 | Nelson | Feb. 27, 1962 |
| 3,061,739 | Stone | Oct. 30, 1962 |